United States Patent [19]

Swann

[11] Patent Number: 5,013,017

[45] Date of Patent: May 7, 1991

[54] ADAPTABLE MODULAR FIXTURING SYSTEM

[76] Inventor: Rex Swann, 800 Commonwealth Dr., Warrendale, Pa. 15086

[21] Appl. No.: 320,469

[22] Filed: Mar. 8, 1989

[51] Int. Cl.⁵ ............................................. B25B 1/00
[52] U.S. Cl. ..................................... 269/88; 269/900
[58] Field of Search ................... 269/86, 88, 900, 901, 269/9, 45

[56] References Cited

U.S. PATENT DOCUMENTS

| | | | |
|---|---|---|---|
| 3,967,816 | 7/1976 | Ramsperger et al. | 269/900 |
| 4,125,251 | 11/1978 | Jamieson Jr. | 269/88 |
| 4,619,446 | 10/1986 | Yang | 269/88 |
| 4,711,437 | 12/1987 | Longenecker et al. | 249/900 |

Primary Examiner—Judy Hartman

[57] ABSTRACT

A modular system of pillars for constructing rigid frames with flat, projection-free surfaces being the base for workpiece fixtures for numerical control machining is described.

3 Claims, 3 Drawing Sheets

ADAPTABLE MODULAR FIXTURING SYSTEM

BACKGROUND

1. Field of the Invention

The invention relates to modular fixturing systems as used in numerically controlled machining for holding workpieces and in particular to the base or sub-base assembly on which other elements are mounted.

2. Description of the Prior Art

Numerical Control (NC) or Computer Numerical Control (CNC) machines are expensive capital equipment. Their advantages include precision, repeatability and flexibility but the wide range of operations which they are called on to carry out often requires considerable re-tooling and extensive setting up, including the construction of appropriate fixturing to hold the workpiece firmly in position at the required orientation.

In an effort to minimize NC machine down time during set up and to reduce costs, there has been a move away from dedicated hard fixturing to modular systems. Modular fixturing can be quickly set up and torn down as needed, can be easily adjusted for workpiece variations such as inconsistent casting and may be re-used many times over, all significant features in cost reduction.

A number of modular fixturing systems are commercially available. All feature a range of components which are readily interconnected to construct workpiece fixtures as needed. However, in all cases the starting point for constructing the fixturing is essentially the same; a base plate, cube (also known as a column or tombstone) or angle plate. This attaches to the bed of the NC machine and forms the base for the fixturing. The requirements for this base are rigidity and flat surfaces, free from projections.

Heretofore it has been necessary for manufactures of modular fixturing systems to provide and for users to stock these basic elements in a wide range of sizes so as not to limit the size or type of fixturing that may be constructed. Users of NC machines would therefore find considerable advantage in a system for constructing modular fixturing bases in a wide range of sizes and of various shapes from a single type of element provided in a limited range of sizes.

OBJECTS AND ADVANTAGES

Accordingly several objects and advantages of this invention are: to provide an adaptable system for constructing the bases for modular fixturing systems, to further move away from dedicated fixturing to a more completely modular system, to further reduce the costs associated with workpiece fixturing and to increase the utilization rates for NC machines.

DRAWING FIGURES

DRAWING REFERENCE NUMERALS

| | |
|---|---|
| 10 square cross-section pillar | 16 type A long face |
| 11 dowels | 17 countersunk bolt clearance holes |
| 12 bolt | 18 type B long face |
| 13 pillar end-face | 19 bolt thread clearance holes |
| 14 tapped central hole | 20 second dowel holes |
| 15 first dowel holes | 21 secondary fixture holes |

DESCRIPTION OF THE PREFERRED EMBODIMENT

Figure 1:
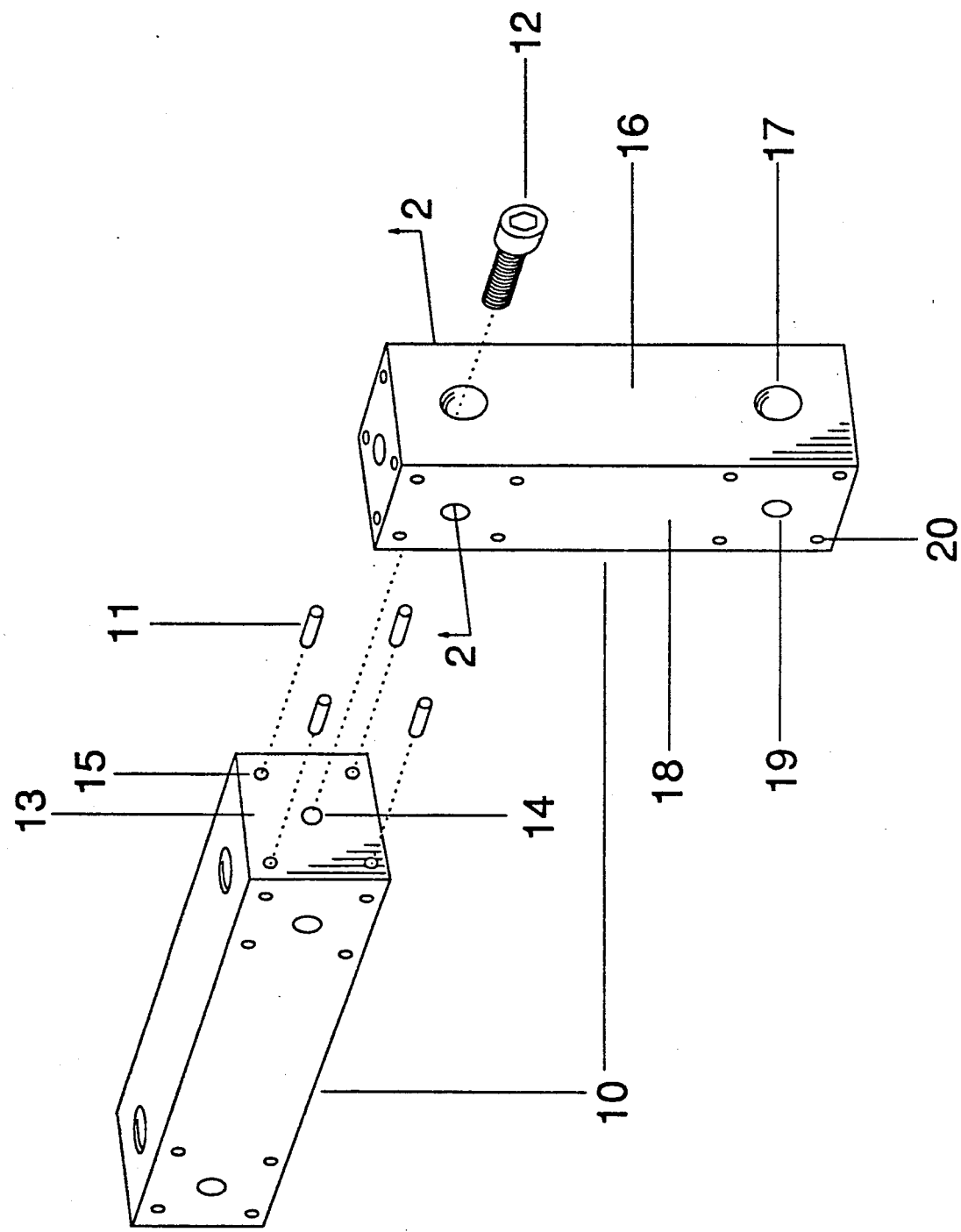
FIG. 1 is an exploded perspective view illustrating the connection of two pillars.

FIG. 1 illustrates, in an exploded perspective view, the assembly of two pillars 10 of square cross section, dowels 11 and first bolt 12. Both ends faces 13 of each pillar 10 have a central hole 14, tapped to accept bolt 12. Equidistant from central hole 14 are first dowel holes 15.

At each end of each pillar 10 are a pair of perpendicularly intersecting countersunk bolt clearance holes 17. Each countersunk bolt clearance hole 17 passes from the center line of type A face 16 completely through pillar 10 to emerge on the center line of opposing type B face 18, providing bolt thread clearance hole 19. The countersunk portion of countersunk bolt clearance holes 17 is greater than one half the width of pillar 16. Countersunk bolt clearance 17 are at a distance from the end faces equal to one half the width of pillar 16.

Disposed around bolt thread clearance holes 19 are second dowel holes 20 positioned identically to first dowel holes 15 in end faces 13. On assembly, dowels 11 engage in the dowel holes provided in the end faces and Type B faces, preventing rotation of the pillars.

Figure 2:
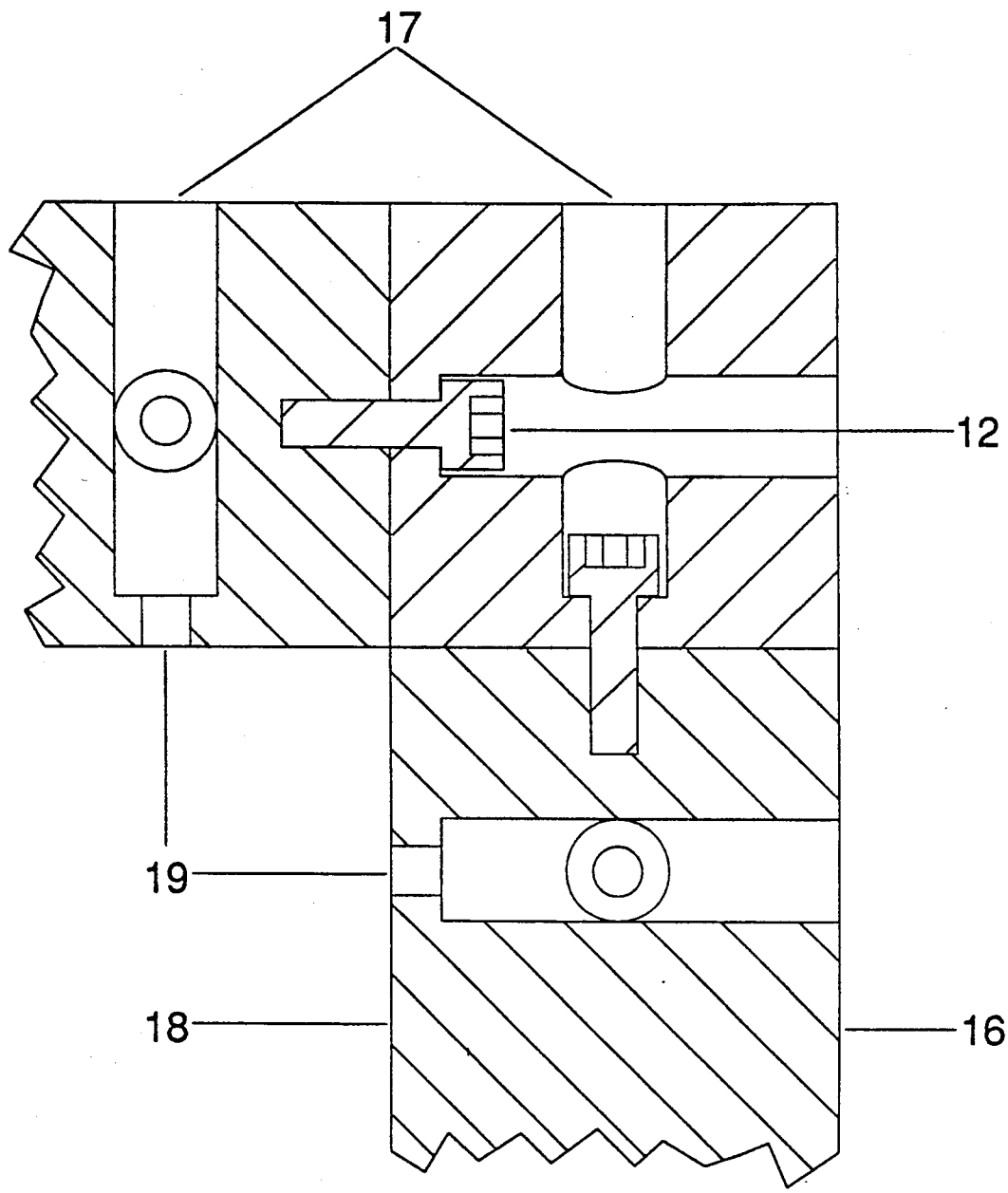
FIG. 2 is a horizontal section through three orthogonally connected pillars.
Figure 3:
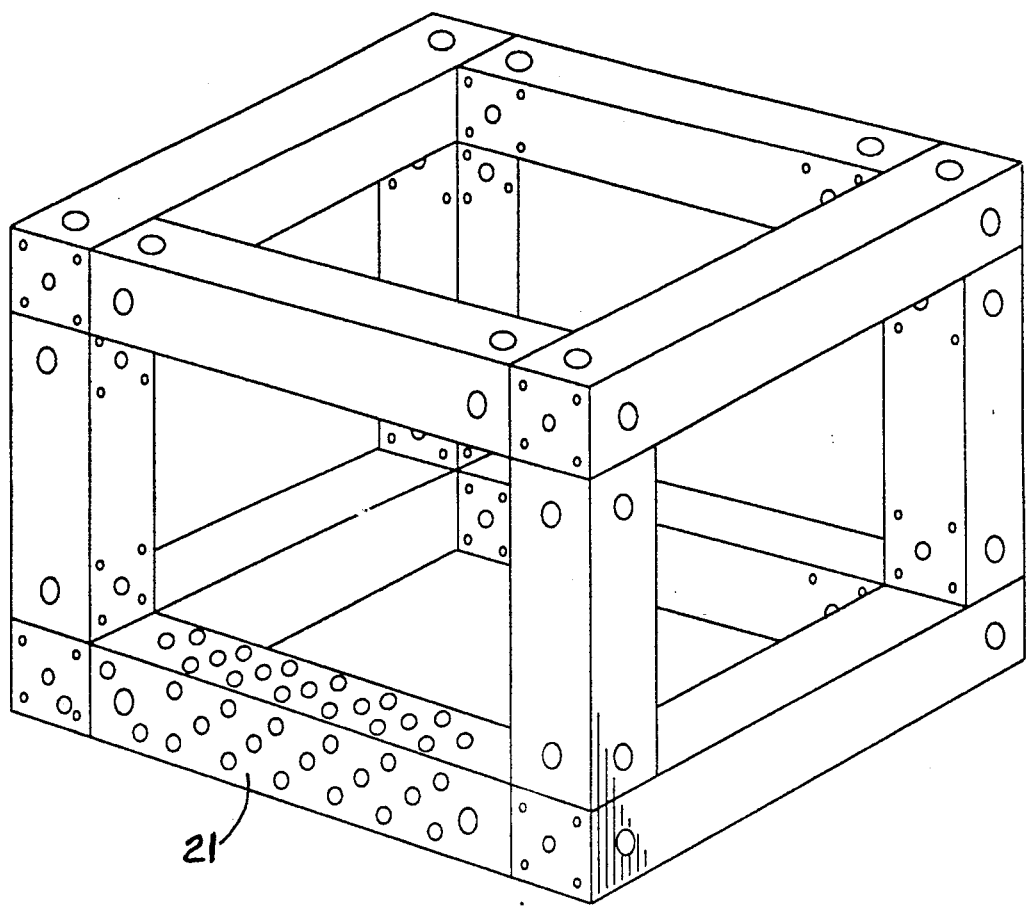
FIG. 3 is a perspective view illustrating one possible way of connecting the elements.

FIG. 2 shows a horizontal section through the pillars of FIG. 1 after the addition of a third pillar. The first and second pillars are joined by passing bolt 12 through the countersunk hole in the end of the pillar and screwing it into the tapped central hole 14 in the end face of the second pillar. Dowels 11 engage dowel holes 15 and similar dowel holes in the first pillar to prevent relative rotation of the two pillars. Once bolt 12 is screwed home, the perpendicularly intersecting bolt hole is clear to accept a second bolt to join the first two pillars with a third pillar. FIG. 3 illustrates one possible way of using the invention to construct a rigid cube with flat surfaces free from projections which can form the basis for a workpiece fixture. The long faces of the pillars are shown intact apart from the holes necessary to achieve the desired interconnection of the pillars. The long faces of the pillars are patterned with secondary fixture holes 21 to facilitate the mounting of blocks, tools and jaws as required. A particular advantage of the preferred embodiment of the invention is that different patterns of secondary fixture holes may be cut in the different long faces of the pillars and on assembly the desired face is simply rotated into position.

While the above description contains many specificities, the reader should not construe these as limitations on the scope of the invention but merely as exemplifications of the preferred embodiments thereof. Those skilled in the art will envisage other possible variations within its scope. For example, by the use of additional pillars the single cube illustrated in FIG. 3 is readily extended to a double cube. Furthermore, while manufacture of the invention is simplified by making all the pillars identical, there are advantages for users in having pillars of several of different lengths. Additionally, it is not necessary that all the pillars have a complete set of connecting holes. For example, to construct the cube illustrated in FIG. 3, it is only necessary that four pillars have the complete set of holes described and claimed. The other six only require the described hole patterning in their end faces, thereby freeing additional surface area for constructing the remainder of the fixturing. Finally, with the addition of other components, the invention can be extended from simply being a base for a workpiece fixture to a complete modular fixturing system. The same system of interconnecting pillars is also readily extended to the interconnection of plates.

What is claimed is:

1. A plurality of bolts, a plurality of dowels and a plurality of long pillars, each long pillar comprising:
   (a) a first end face having a first threaded center hole,
   (b) a second end face having a second threaded center hole,
   (c) a first countersunk bolt clearance hole passing completely through said long pillar, the countersunk portion being greater than one half of the overall length, said first countersunk bolt clearance hole being perpendicular to said long pillar's long axis and proximal to said first end face,
   (d) a second countersunk bolt clearance hole passing completely through said long pillar, the countersunk portion being greater than one half of the overall length, said second countersunk bolt clearance hole being perpendicular to said long pillar's long axis and perpendicularly intersecting said first countersunk bolt clearance hole,
   (e) a third countersunk bolt clearance hole passing completely through said long pillar, the countersunk portion being greater than one half of the overall length, said third countersunk bolt clearance hole being perpendicular to said long pillar's long axis and proximal to said second end face,
   (f) a fourth countersunk bolt clearance hole passing completely through said long pillar, the countersunk portion being greater than one half of the overall length, said fourth countersunk bolt clearance hole being perpendicular to said long pillar's long axis and perpendicularly intersecting said third countersunk bolt clearance hole, and
   (g) a plurality to dowel holes,
   (h) a first long pillar being attached to a second long pillar by passing a first bolt through said first long pillar's first countersunk bolt clearance hole and screwing said first bolt into said second pillar's first end face's threaded center hole,
   (i) a third long pillar being attached to said first long pillar by passing a second bolt through said first long pillar's second countersunk bolt clearance hole and screwing said second bolt into said third pillar's first end face's threaded center hole, and
   (j) relative rotation of the pillars being prevented by employing said plurality of dowels to engage opposing dowel holes, whereby an orthogonal arrangement of pillars is constructed and by extension ay required orthogonal arrangement of pillars may be similarly constructed from only a single design of pillar.

2. The invention of claim 1 wherein
   (a) each pillar of said plurality of long pillar is of square section,
   (b) each countersunk bolt clearance hole is positioned at a distance from the pillar end face equal to one half the pillar's width,
   (c) said plurality of dowel holes comprises a first square pattern of four dowels holes disposed symmetrically about each threaded center hole and a second square pattern of four dowels holes disposed symmetrically about each countersunk bolt clearance hole's smaller end.

3. The invention of claim 1 further including a plurality of secondary fixture holes disposed over each long lillar's long faces whereby any number of secondary fixtures may be rigidly attached.

* * * * *